A. SCHRECK.
ANIMAL TRAP.
APPLICATION FILED NOV. 4, 1913.

1,117,450. Patented Nov. 17, 1914.

Witnesses:
Christ Feinle, Jr.
James A. Koehl

Inventor,
Adolph Schreck.
By Victor J. Evans,
Attorney.

UNITED STATES PATENT OFFICE.

ADOLPH SCHRECK, OF PHOENIX, ARIZONA.

ANIMAL-TRAP.

1,117,450. Specification of Letters Patent. Patented Nov. 17, 1914.

Application filed November 4, 1913. Serial No. 799,199.

*To all whom it may concern:*

Be it known that I, ADOLPH SCHRECK, a citizen of the United States, residing at Phoenix, in the county of Maricopa and State of Arizona, have invented new and useful Improvements in Animal-Traps, of which the following is a specification.

This invention relates to animal traps, and particularly to mouse traps and to that type of traps known in the art as self set and ever set; and it has for its primary object the provision of a trap of this character wherein the receptacle of the trap is sub-divided into an entrance run which opens onto one end of the trap and a trapping compartment which opens into the entrance run and which is normally separated therefrom by means which will prevent the entrapped animals from returning to the entrance run.

Another object of the invention is the provision of guard plates that are positioned relatively in the entrance run so that the bait may be placed between the plates and exposed so as to entice the animals into the trapping compartment.

A further object of the invention is the provision of a trapping compartment which will be so constructed that the trapped animals may be removed when desired with facility.

A still further object of the invention is the provision of an entrance run which will be removable from the floor of the trapping compartment so as to expose the bait containing portion of the floor of said compartment when it is desired to supply the trap with the desired portion of bait.

With these and other objects in view, the invention consists of certain novel features of construction, combination and arrangement of parts, as will be hereinafter described and claimed.

Figure 1:
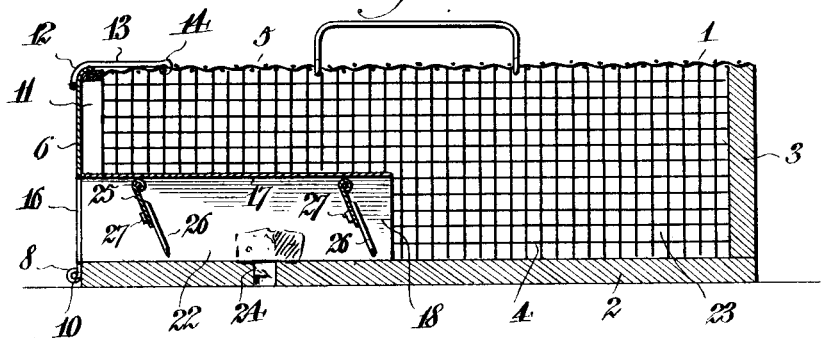
Figure 2:
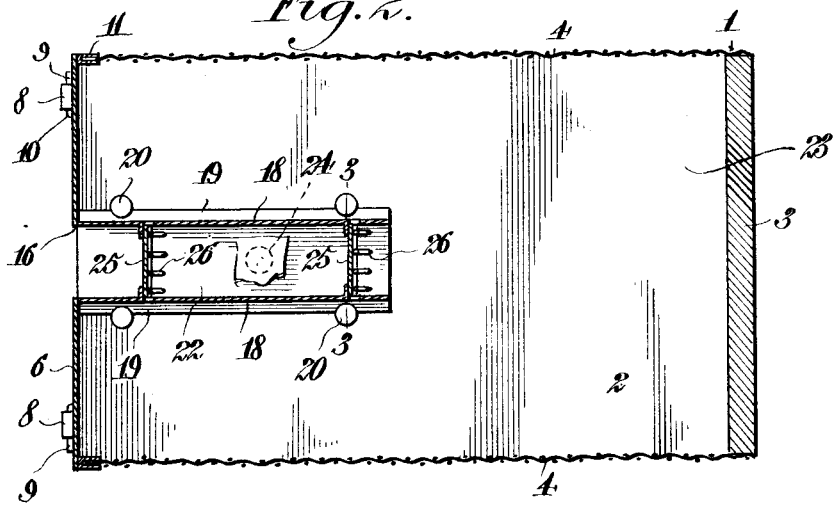
Figure 3:
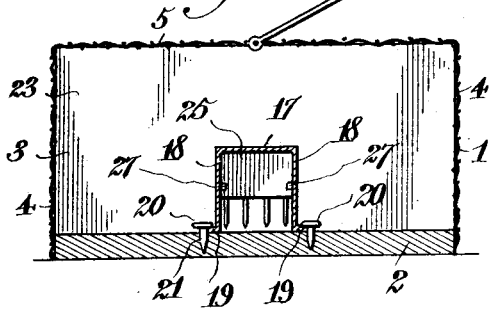
Figure 4:
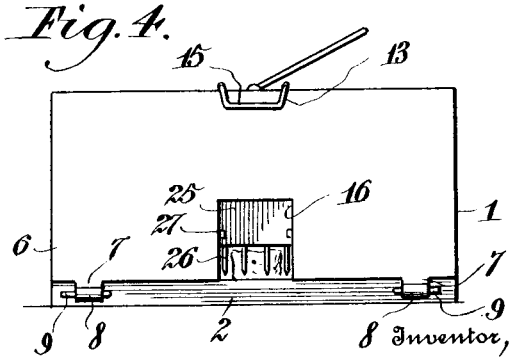

In the accompanying drawings:—Figure 1 is a vertical longitudinal section through the trap; Fig. 2 is a horizontal section therethrough; Fig. 3 is a transverse section taken on the line 3—3 of Fig. 2; and Fig. 4 is an end view of the trap.

The trap comprises a receptacle 1 having a floor or bottom 2, preferably a solid end 3, foraminous sides 4, a foraminous top 5 and a swinging closure 6. The swinging closure is disposed opposite to the end 3 and as illustrated it is provided with integral depending extensions 7 having loops 8 pivoted from extensions 9 of members 10 that are adapted to be driven into the adjacent end of the floor 2. The vertical edges of the sides 4 and the forward edge of the top 5 are each embraced by a suitable metallic reinforcing strip 11 that are designed also to protect the sides 4 and said top 5 to prevent the wire from which said portions are made from being accidentally torn at the open end of the trap. The closure 6 is adapted to swing over the open end of the trap and as illustrated it is provided with a curved upper edge 12 which is designed to overlap the reinforcing bar along the adjacent edge of the top 5. A suitable keeper 13 is pivoted at 14 to the top 5, and at 15 the keeper is provided with an engaging portion which may be adjusted over the curved edge 12 of the closure 6 and connected against one side of the closure to cause the latter to retain a closed position. Said closure 6 is provided with an opening 16, for a purpose to be hereinafter explained.

Upon the floor 2 is mounted a member which is preferably formed of sheet metal bent in substantially U-form in transverse section so as to be formed with a top 17 and sides 18, the latter having terminal base flanges 19 that are adapted to lie against the upper surface of the floor and to be projected beneath the heads 20 of vertical retaining devices 21 which rise from the floor. The sides 18 are relatively yieldable and normally they tend to move away from each other so as to effectually cause the flanges 19 to properly engage beneath the mentioned heads 20. The walls 17 and 18 define what will be subsequently termed a trapping run 22 having its forward end communicating or arranged in direct line with the opening 16 in the closure 6. The run terminates for a considerable distance beyond the end 3 of the receptacle 1, and as described it is evident that through the arrangement of the run the interior of the trap is divided by a main trapping chamber 23 which is separate from said run and which is designed to hold the animals against escape after passing from the run.

The floor 2 is provided with one or more bait receiving recesses 24 located at suitable points between the ends of the run. The side walls 18 of the run support pivoted guard plates 25 each having its lower end provided with a plurality of spurs 26.

These plates normally extend downwardly at an angle in the direction of the wall 3 or toward the discharge end of the run and they are gravitationally influenced to be retained in the described positions. The plates are disposed on both sides of the bait receiver 24 so that an animal after passing through the opening 16 in the closure 6 will have to pass into the trapping compartment 23. The inclination of each of the plates is such that after the animal moves beyond the same he is held against returning as will be obviously understood. The sides of the walls 18 are provided with stops 27 that are positioned so as to prevent the guard plates from moving beyond prescribed positions. This is desirable in order that the spurs of the plates will be held against becoming accidentally embedded in the floor of the trap. By arranging the run as described spaces are formed between the sides of the run and the sides 14 of the receptacle 1 by means of which the animal may be discharged from the open end of the trap when the closure 6 is moved to an open position.

From the foregoing description, taken in connection with the accompanying drawings, the construction and operation of the invention will be readily understood without requiring a more extended explanation.

I claim:—

A trap comprising a solid base, an end wall, a covering connected with the outer longitudinal edges of the base and to the top transverse edge of the end wall, a closure having an opening pivotally connected to the front edge of the base and adapted to close the front end of the trap, a runway detachably connected to the base and disposed longitudinally thereof and in spaced relation to the sides of the covering for a portion of its length, said runway registering with the opening in the closure, means pivotally connected with the side walls of the runway at points adjacent the terminals thereof for entrapping the animal, and means formed integral with the side walls of the runway for limiting the movement of the last named means in one direction only.

In testimony whereof I affix my signature in presence of two witnesses.

ADOLPH SCHRECK.

Witnesses:
HARRY L. SHEDD,
S. J. KENYON.

Copies of this patent may be obtained for five cents each, by addressing the "Commissioner of Patents, Washington, D. C."